June 13, 1939.  A. W. HERRINGTON  2,162,198
CONTINUOUS-TRACK TRACTOR
Filed March 25, 1937
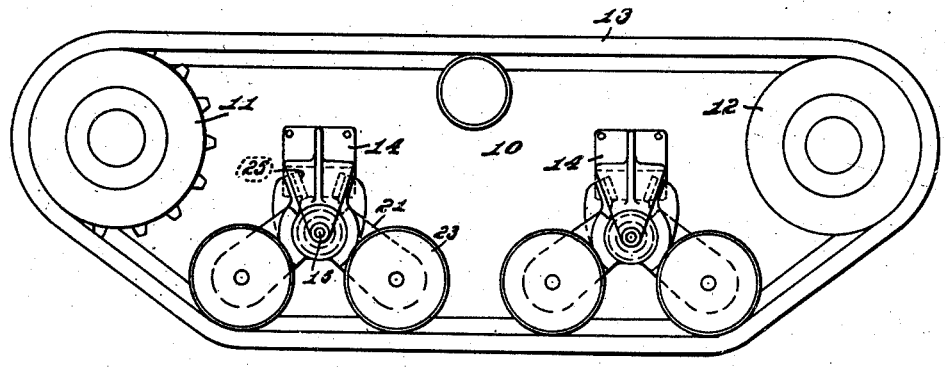
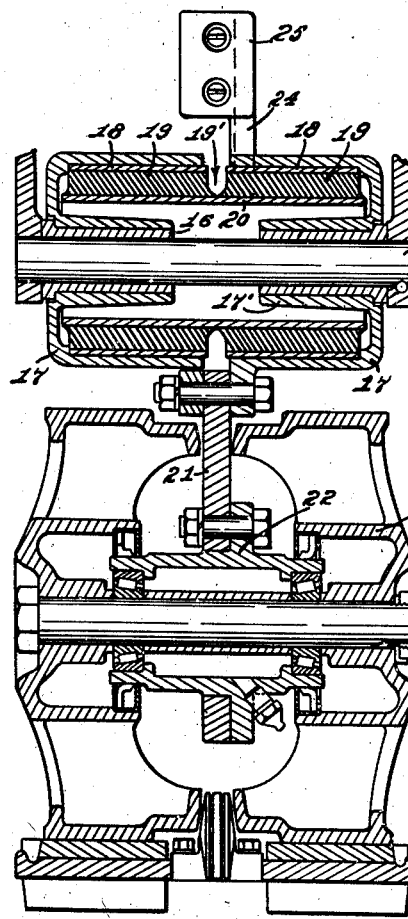
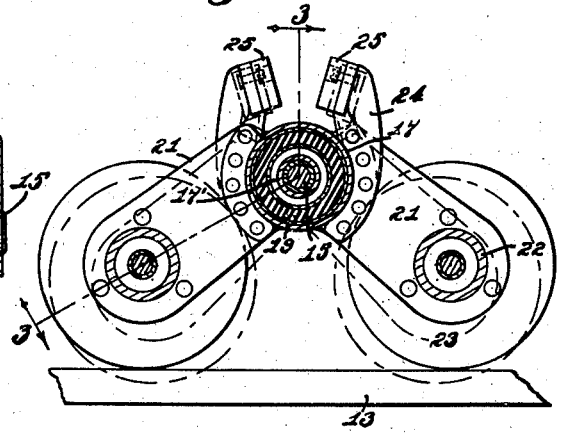
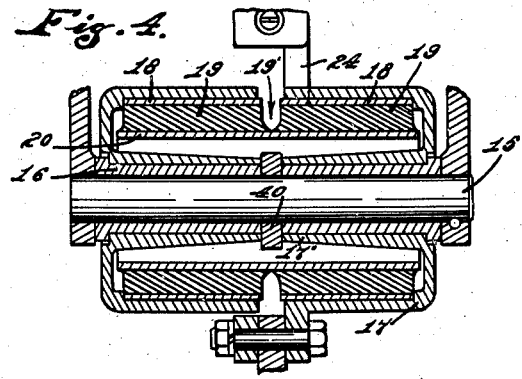
INVENTOR.
Arthur W. Herrington,
BY Hood & Hahn.
ATTORNEYS.

Patented June 13, 1939

2,162,198

UNITED STATES PATENT OFFICE 2,162,198

CONTINUOUS-TRACK TRACTOR

Arthur W. Herrington, Indianapolis, Ind., assignor to Marmon-Herrington Company, Inc., Indianapolis, Ind., a corporation of Indiana Application March 25, 1937, Serial No. 132,900

2 Claims. (Cl. 305—9)

The object of my invention is to provide an improved resilient pivotal mounting for the idler road supporting wheels for an endless-track, or track-laying type of motor vehicles.

The accompanying drawing illustrates my invention:

Fig. 1 is a diagrammatic fragmentary side elevation outline of a vehicle embodying my invention;

Fig. 2 is a side elevation, in partial vertical section, on a larger scale, of one pair of load-supporting idlers, and associated track fragment, constructed in accordance with my invention;

Fig. 3 is a section on line 3—3 of Fig. 2 but on a larger scale; and

Fig. 4 is a fragmentary section on line 3—3 of Fig. 2 showing a slight modification.

In the drawing 10 indicates the main body of the vehicle having the usual track driving sprocket 11, track supporting idler 12 and endless track belt 13 of usual form.

Secured to each side of the main body 10 are brackets 14, each carrying a fixed horizontal trunnion pin 15 carrying two bearing bushings 16, 16 upon which are journaled thimbles or shells 17, 17 within which are non-rotatively mounted metal rings 18, 18 to the inner surfaces of which are vulcanized the external surfaces of rubber rings 19, 19 the inner surfaces of which are vulcanized to the external surface of a metal ring 20, the bore of which is conveniently somewhat larger than the external diameters of the hub portion 17' of shells 17.

To each shell 17 is secured a radially projecting arm 21 provided at its outer end with a bearing sleeve 22 in which is journaled an idler wheel structure 23 which rests upon the lower run of the track belt 13. Each shell 17 also carries an upwardly projecting arm 24 which carries a resilient bumper 25.

The two elements 19, 19 may be a single continuous element (without the intermediate notch 19').

The two shells 17, 17 are initially non-rotatively associated with the tubes 18, 18 at an angular relationship approximately as indicated by dotted lines in Fig. 2 so that, when the unit illustrated in Figs. 2 and 3 is placed in position on trunnion pin 15 the two idler carrying arms 21, 21 must be swung upwardly so as to oppositely torsionally circumferentially stress the rubber ring 19, 19.

The initial torsion stressing of the rubber 19, 19 provides a downward bias for each idler and the torsional elastic limit of the rubber 19, 19 is such as to permit necessary upward yield of each idler, the force (due to the passage of the track over a local ground elevation) causing such upward yield being transmitted through the rubber 19, 19 and inner ring 20 to the companion idler through its carrying arm 21.

The necessary diameter and radial thickness of the rubber 19 will, of course, be dependent upon the load conditions and quality of the rubber, all of which may be readily determined for a given road condition by methods of computation well known.

The bumper elements 25 face each other and limit relative spreading of the companion idler carrying arms 21, 21.

It will be readily understood that in some instances the rubber sections 19, 19 need not be completely annular but that the probabilities are that complete annuli will be more satisfactory from production and operative viewpoints.

It will be noted that the hubs 17' of shell 17 are oppositely shouldered against their respective bushings 16 which are held against axial movement outwardly by the arms of bracket 14 so that the idler wheel unit, comprising the two associated idlers and their carrying arms, is held against movement axially of pin 15 so that the rubber torsion element 19 is not subjected to stresses axially thereof.

This is quite important for the reason that, if the inner periphery of the rubber torsion element were vulcanized directly to the pivot pin 15, the idler wheel unit would be subjected to stresses axially of the pivotal mounting thus affording a possibility of lateral wobble of the main body of the vehicle.

In Fig. 4, I show a slight modification wherein the inner ends of the hub portions 17' abut upon opposite sides of a thrust ring 40 mounted upon pin 15.

I claim as my invention:

1. In a vehicle of the track-laying type, a load-supporting idler group, comprising a pair of co-axial swinging idler-carrying arms, each provided with a cup-shaped pivoting element, a connecting unit sleeved within said pair of cup-shaped elements and non-rotatively associated with each of said cup-shaped elements without substantial compression, said connecting unit comprising circumferentially yieldable rubber portions which are respectively non-rotatively anchored to said cups and to each other, and means limiting the relative movement of the two arms within the elastic and bonded limits of said rubber portions.

2. In a vehicle of the track-laying type, a load-supporting idler group, comprising a pair of coaxial swinging idler-carrying arms, each provided with a cup-shaped pivoting element, and a connecting unit sleeved within said pair of cup-shaped elements, said units comprising a central sleeve, two axially spaced rubber annuli adherent to the exterior of said sleeve, and two axially spaced rings, the interiors of which are adherent respectively to said two rubber annuli and the exteriors of which are non-rotatively interlocked with the respective cup-shaped elements.

ARTHUR W. HERRINGTON.